US011281443B1

(12) United States Patent
Brandes

(10) Patent No.: US 11,281,443 B1
(45) Date of Patent: Mar. 22, 2022

(54) ORGANIZING DEPLOYMENT PACKAGES FOR SOFTWARE APPLICATIONS AND SERVICES

(71) Applicant: Tableau Software, LLC, Seattle, WA (US)

(72) Inventor: Nathan Brandes, Palo Alto, CA (US)

(73) Assignee: TABLEAU SOFTWARE, LLC, Seattle, WA (US)

(*) Notice: Subject to any disclaimer, the term of this patent is extended or adjusted under 35 U.S.C. 154(b) by 0 days.

(21) Appl. No.: 16/945,739

(22) Filed: Jul. 31, 2020

(51) Int. Cl.
| | |
|---|---|
| *G06F 8/61* | (2018.01) |
| *G06F 8/65* | (2018.01) |
| *H04L 29/08* | (2006.01) |
| *G06F 16/174* | (2019.01) |
| *H04L 67/00* | (2022.01) |
| *H04L 67/06* | (2022.01) |
| *H04L 67/1097* | (2022.01) |

(52) U.S. Cl.
CPC ............. *G06F 8/63* (2013.01); *G06F 8/65* (2013.01); *G06F 16/1748* (2019.01); *H04L 67/06* (2013.01); *H04L 67/1097* (2013.01); *H04L 67/34* (2013.01)

(58) Field of Classification Search
CPC .......... G06F 8/63; G06F 8/65; G06F 16/1748; H04L 67/06; H04L 67/34; H04L 67/1097
See application file for complete search history.

(56) References Cited

U.S. PATENT DOCUMENTS

| | | | |
|---|---|---|---|
| 9,811,806 B1 * | 11/2017 | Kuang | G06F 16/128 |
| 10,348,705 B1 * | 7/2019 | Volkanov | H04L 63/065 |
| 2006/0236320 A1 * | 10/2006 | Chen | G06F 8/63 |
| | | | 717/176 |

(Continued)

FOREIGN PATENT DOCUMENTS

CN          107819802 A  *  3/2018

OTHER PUBLICATIONS

Zhang et al., "BED: A Block-Level Deduplication-Based Container Deployment Framework", 2020, Springer Nature Switzerland AG 2020 (Year: 2020).*

(Continued)

*Primary Examiner* — Wei Y Zhen
*Assistant Examiner* — Junchun Wu
(74) *Attorney, Agent, or Firm* — Morgan, Lewis & Bockius LLP

(57) ABSTRACT

A computer system organizes layers in software deployment images. For each of a plurality of software services, the system identifies a respective plurality of image layers for deploying the respective software service to other computer systems. Each respective image layer has a respective unique size and the software services share a plurality of the image layers. The system determines a respective ordered sequence of image layers for each of the software services that maximizes a total size of shared initial image layers across the software services and stores each of the image layers in the memory. For each of the software services, the system forms a respective service image comprising a (Continued)

manifest specifying the respective image layers ordered according to the respective determined ordered sequence. The system then publishes each of the service images to a distribution server for download by the other computing systems.

17 Claims, 8 Drawing Sheets

(56) References Cited

U.S. PATENT DOCUMENTS

| | | | | |
|---|---|---|---|---|
| 2017/0083544 A1* | 3/2017 | Alton | ................... | G06F 8/60 |
| 2017/0177877 A1* | 6/2017 | Suarez | ................ | G06F 16/188 |
| 2017/0180346 A1* | 6/2017 | Suarez | ................... | G06F 8/71 |
| 2017/0220329 A1* | 8/2017 | Yang | ................... | G06F 8/60 |
| 2017/0277524 A1* | 9/2017 | Bhat | ................... | G06F 8/63 |
| 2018/0129479 A1* | 5/2018 | McPherson | ......... | G06F 9/45558 |
| 2018/0248770 A1* | 8/2018 | Regmi | ................ | G06F 9/4411 |
| 2018/0276215 A1* | 9/2018 | Chiba | ................... | G06F 16/51 |
| 2019/0146772 A1* | 5/2019 | Griffin | ................... | G06F 9/455 717/121 |
| 2019/0310872 A1* | 10/2019 | Griffin | ................ | G06F 9/4411 |
| 2019/0347121 A1* | 11/2019 | Luo | ................... | G06F 3/0644 |
| 2020/0019369 A1* | 1/2020 | Tomotoshi | ............ | G06F 3/1454 |
| 2020/0241867 A1* | 7/2020 | Gainsborough | .......... | G06F 8/63 |

OTHER PUBLICATIONS

Ma et al., "Efficient Live Migration of Edge Services Leveraging Container Layered Storage", Sep. 2019, vol. 18 No. 9 (Year: 2019).*

Huang et al., "FastBuild: Accelerating Docker Image Building for Efficient Development and Deployment of Container", 2019, IEEE (Year: 2019).*

Ozcan et al., "Remote Debugging for Containerized Applications in Edge Computing Environments", 2019, IEEE (Year: 2019).*

* cited by examiner

ORGANIZING DEPLOYMENT PACKAGES FOR SOFTWARE APPLICATIONS AND SERVICES

TECHNICAL FIELD

This application relates generally to deploying software applications and service images, and more specifically to optimizing the construction of service images by maximizing the overlap between two or more service images.

BACKGROUND

Software deployment requires a multitude of files and takes up precious processing and communication bandwidth. A large image size increases the download time and takes longer to deploy. Each image includes layers that are combined in specific orders to produce a complete image. Each image layer can contain one or more packages that perform specific services. Over time, the number of packages being used by all services will continue to grow and thus, the size of the images will grow as well. Without oversight, deployment issues tend to worsen over time.

One simple way to cut down on image size is to create service images that only contain layers that are specifically required for deployment of the particular service. However, this method is frequently not optimal when the service images have shared content. In fact, this can lead to having total deployment sizes even larger.

An open-source project, Docker, allows users to package software applications into a software container. These containers can be deployed from any machine running Docker and are separate from the host hardware and operating system. A Docker image is a read-only template containing software. For example, a Docker image can contain an operating system and a web application. These images are used to create Docker containers. Such containers are similar to directories and hold everything necessary for an application to run. Docker images are held in public or private registries from which they can be downloaded or uploaded. Many Docker images contain the same base files with only a file or two that are distinct from each other. Repeatedly downloading and running each Docker image requires extensive hardware and software resources.

The order in which the packages are layered is important. Since Docker images are built from the bottom up, each layer and the order in which it is called has an impact. Because Docker is designed as a general purpose system for deployment, it has to assume that the execution order is relevant. For example, if there is a command in the deployment to create a file and another command to modify the created file, the creation must occur first.

SUMMARY

Organizing deployment packages for software applications allows images to be optimized to share layers for faster deployment.

Disclosed implementations provide a unique and novel way to obtain the benefits of sharing layers between service images using only the packages those services need. The present solution increases both the speed of deployment and decreases the required bandwidth for the images.

Disclosed implementations are able to organize optimized layer sharing within an image without manual intervention and/or supervised machine learning. Because the disclosed techniques determine optimal ordering for layers, the techniques are most effective when the content of each layer (the packages) are constructed according to logically related components. Instead of creating monolithic packages that include everything, separating content into a group of files for Feature A, another group of files for Feature B, etc., has at least two beneficial effects. First, when a customer needs less than all of the software applications, the deployment includes only what is needed. Second, having smaller well-defined packages enables the disclosed techniques to better optimize each of the service images.

In accordance with some implementations, a method of organizing layers in software deployment images is performed at a computing system having one or more processors and memory storing one or more programs configured for execution by the one or more processors. For each of a plurality of software services, the system identifies a respective plurality of image layers for deploying the respective software service to other computer systems. Each respective image layer has a respective unique size and the software services share a plurality of the image layers. The system determines a respective ordered sequence of image layers for each of the software services that maximizes a total size of shared initial image layers across the software services and stores each of the image layers in the memory. For each of the software services, the system forms a respective service image comprising a manifest specifying the respective image layers ordered according to the respective determined ordered sequence. The system publishes each of the service images to a distribution server for download by the other computing systems.

In some instances, each image layer comprises a single package. In some instances, one or more of the image layers comprises two or more packages.

In some implementations, a first software service having image layers with sizes $s_{1,1}, s_{1,2}, \ldots, s_{1,m}$ and a second software service having image layers with sizes $s_{2,1}, s_{2,2}, \ldots, s_{2,n}$ have shared initial image layers when there is a positive integer k with $s_{1,1}=s_{2,1}, s_{1,2}=s_{2,2}, \ldots,$ and $s_{1,k}=s_{2,k}$. In some implementations, the size of the shared initial image layers is $s_{1,1}+s_{1,2}+ \ldots +s_{1,k}$.

In some implementations, the system uses the following steps to determine the respective ordered sequence of image layers for each of the software services comprises First, for each software service, form a respective node containing sizes of the respective plurality of image layers in the respective node. Second, for each pair of nodes having at least one shared size, form a respective edge, between the respective pair or nodes, having weight equal to a respective total of shared sizes between the respective pair of nodes. Third, select from the edges to maximize the total size of shared initial image layers.

In some implementations, the system uses the following steps to select from the edges to maximize the total size of shared initial image layers. The process is iterative, and continues until there are no remaining edges among the remaining nodes. In each iteration, the system identifies a pair of nodes having an edge with maximal weight, forms a new artificial node whose sizes correspond to sizes in the identified maximal edge, forms a respective directed edge from each of the nodes in the identified pair of nodes to the new artificial node, and disregards the identified pair of nodes in subsequent iterations. For purposes of the process, the new artificial node "replaces" the two nodes that were used to construct it. The new artificial node may have edges to other nodes (i.e., when the sizes in the artificial node are the same as sizes in any of the other nodes still under consideration). Once the iterative process comes to an end (which it must, because there is a finite set of nodes and one fewer node is considered in each iteration), the system traverses the directed edges in reverse to form each of the ordered sequences of image layers for respective software services.

In accordance with some implementations, a system for organizing layers in software deployment images includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

BRIEF DESCRIPTION OF THE DRAWINGS

For a better understanding of the various described implementations, reference should be made to the Description of Implementations below, in conjunction with the following drawings. Like reference numerals refer to corresponding parts throughout the figures and description.

DESCRIPTION OF IMPLEMENTATIONS

Figure 1:
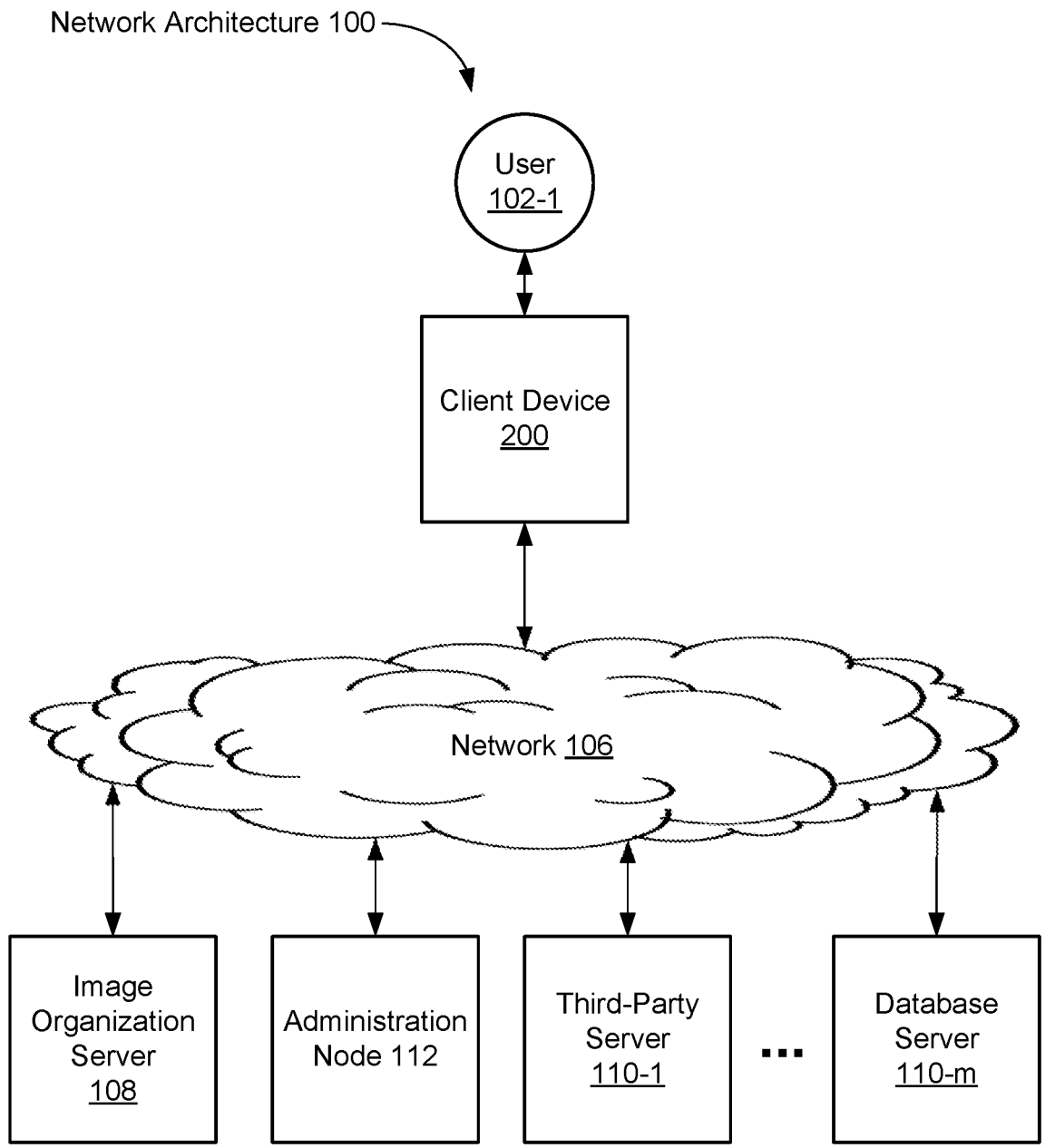
FIG. 1 is a block diagram of a network architecture in accordance with some implementations.

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms "first" and "second" are used herein to describe various elements, these elements should not be limited by these terms. These terms are used only to distinguish one element from another. For example, a first package could be termed a second package, and, similarly, a second package could be termed a first package, without departing from the scope of the various described implementations. The first package and the second package are both packages, but they are not the same package.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "includes," "including," "comprises," and/or "comprising" when used in the specification, specify the presence of stated features, steps, operations, elements, and/or components, but do not preclude the presence or addition of one or more other features, steps, operations, elements, components, and/or groups thereof.

For this application, certain terms are used in a specific way regarding deployment of software using Docker. These terms are to be construed using these specific definitions rather than general generic definitions.

| Term | Definition |
|---|---|
| "Image" | A docker image |
| "Layer" or "Image Layer" | Images are composed of layers. Each layer is a read-only diff and layers are combined in a specific order to comprise a complete image. |
| "Package" | This refers to a directory that contains resources needed by a service. For example bin, lib, templates, etc. |
| "Service Image" | A docker image that when run in a container runs a single service (e.g., the Tableau services backgrounder, vizportal, and vizqlserver) |
| "Base Image" | A docker image that is used as a foundation to create other images. This image might only include packages or.libraries that will be copied into a service image |

FIG. 1 is a block diagram of a network architecture 100 in accordance with some implementations. The network architecture 100 includes a client device 104 communicably coupled to a server system 108 by one or more networks 106 (e.g., the Internet, cellular telephone networks, mobile data networks, other wide area networks, local area networks, metropolitan area networks, and so on). In some implementations, the one or more networks 106 include a public communication network (e.g., the Internet and/or a cellular data network), a private communications network (e.g., a private LAN or leased lines), or a combination of such communication networks. In some implementations, the client device 104 is a computing device such as a laptop computer, desktop computer, server system and/or other appropriate computing devices that can be used to communicate with the server system 108. In some implementations, the server system 108 is a single computing device such as a computer server, while in other implementations, the server system 108 is implemented by multiple computing devices working together to perform the actions of a server system (e.g., cloud computing).

A user 102 employs the client device 104 to access the server system 108 and to participate in corresponding services provided by the server system 108. For example, the client device 104 executes web browser applications that can be used to access an image organization service. As another example, the client device 104 executes software applications that are specific to an image organization service (e.g., organizational service "apps" running on smart phones or tablets, such as a Tableau data-visualization application running on an iPhone®, Android®, or Windows® smart phone or tablet).

In some implementations, the client device 104 connects to one or more external database servers 110. In some implementations, the image organization server 108 stores images within its image repository. In some implementations, an administration node 112 receives one or more images from the image organization server 108 and/or from an external repository and deploys the image.

In some implementations, the network architecture 100 includes external servers **110-1, 110-2, 110-*m*. In some implementations, a given database server 110** includes a database engine configured to access one or more databases that are stored at the respective database server.

In some implementations, the server system 108 enables third-party developers to create applications that are hosted separately by a third-party server 110. In some implementations, a given third-party server 110 is used to host enterprise systems, which are used by client device 104, either directly or in conjunction with the server system 108. In some implementations, a given database server 110 is used to provide database server functionality.

Figure 2:
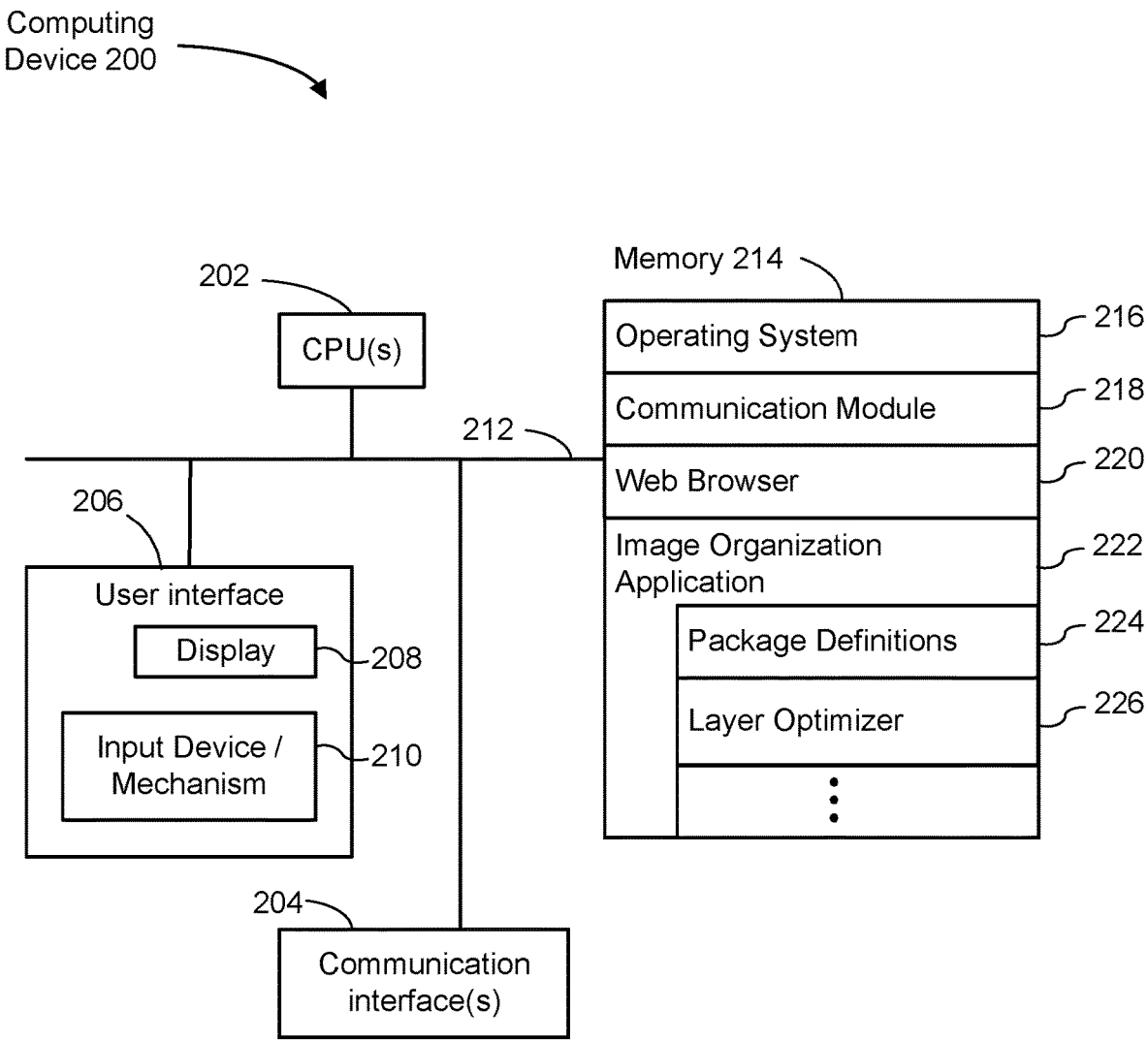
FIG. 2 is a block diagram of a client device in accordance with some implementations.

FIG. 2 is a block diagram illustrating a computing device 200 (e.g., client device 104 or an image organization server 108), which can execute an image organization application 222, or an image organization web application. In some implementations, the computing device 200 displays a graphical user interface. Computing devices 200 include desktop computers, laptop computers, tablet computers, and other computing devices with a display and a processor capable of running an image organization application 222. The image organization application 222 may include a package sorter for determining which packages are necessary for the image. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- an image organization application 222, which includes package definitions 224 and a layer optimizer 226. In some implementations, the image organization application 222 executes as a standalone application (e.g., a desktop application). In some implementations, the image organization application 222 executes within the web browser 220 (e.g., as a web application);

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
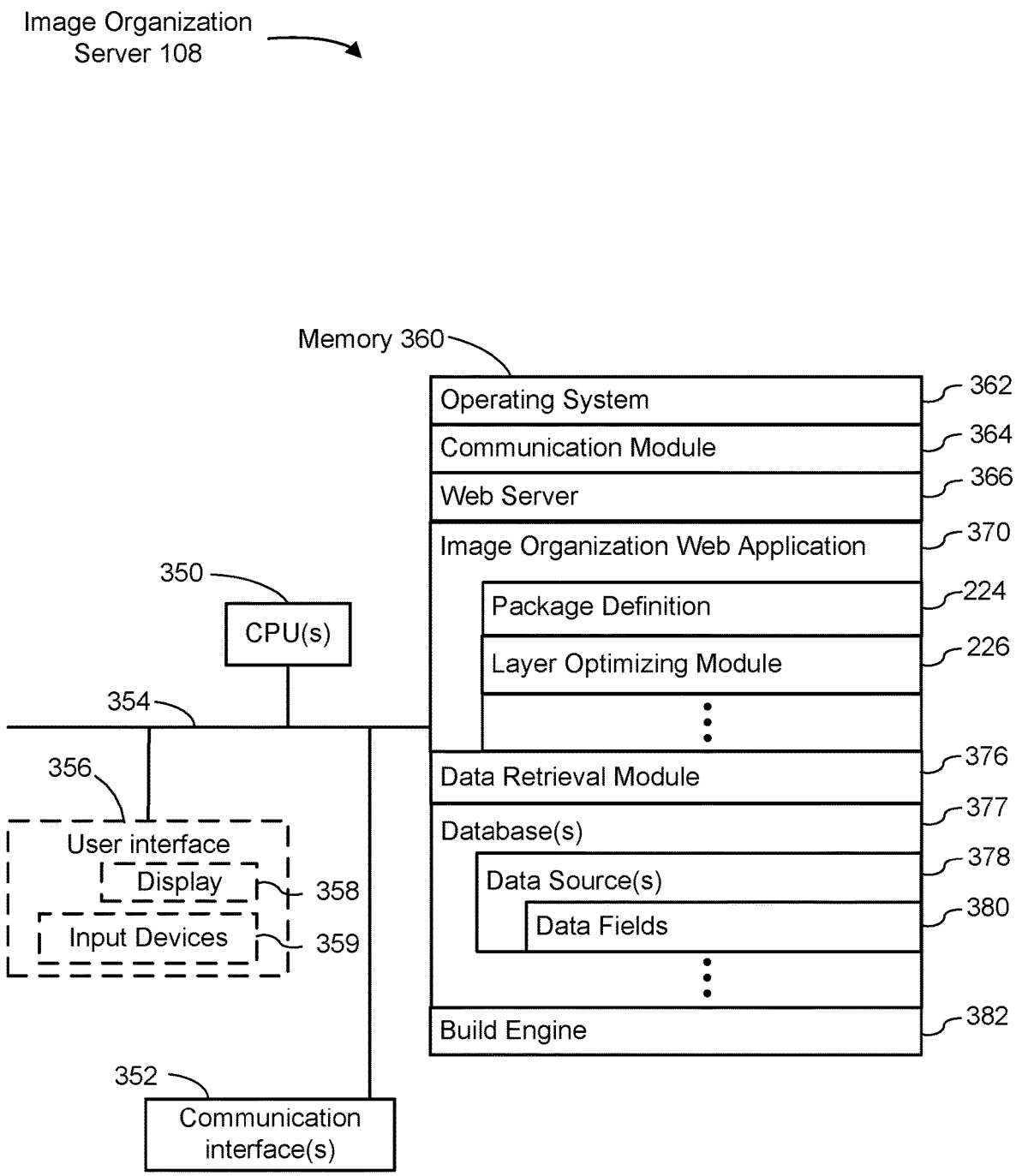
FIG. 3 is a block diagram of a server system in accordance with some implementations.

FIG. 3 is a block diagram of an image organization server 108 in accordance with some implementations. The image organization server 108 may host one or more databases 377 or may provide various executable applications or modules. The server 108 typically includes one or more processing units/cores (CPUs) 350, one or more network interfaces 352, memory 360, and one or more communication buses 354 for interconnecting these components. In some implementations, the server 108 includes a user interface 356, which includes a display 358 and one or more input devices 359, such as a keyboard and a mouse. In some implementations, the communication buses 354 include circuitry (sometimes called a chipset) that interconnects and controls communications between system components.

In some implementations, the memory 360 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 360 includes one or more storage devices remotely located from the CPU(s) 350. The memory 360, or alternatively the non-volatile memory devices within the memory 360, comprise a non-transitory computer readable storage medium.

In some implementations, the memory 360, or the computer readable storage medium of the memory 360, stores the following programs, modules, and data structures, or a subset thereof:

- an operating system 362, which includes procedures for handling various basic system services and for performing hardware dependent tasks;
- a network communication module 364, which is used for connecting the server 108 to other computers via the one or more communication network interfaces 352 (wired or wireless) and one or more communication networks, such as the Internet, other wide area networks, local area networks, metropolitan area networks, and so on;
- a web server 366 (such as an HTTP server), which receives web requests from users and responds by providing responsive web pages or other resources;
- a image organization web application 370, which may be downloaded and executed by a web browser 220 on a user's computing device 200 (FIG. 2). In general, an image organization web application 370 has the same functionality as a desktop image organization application 222, but provides the flexibility of access from any device at any location with network connectivity, and does not require installation and maintenance. In some implementations, the image organization web application 370 includes various software modules to perform certain tasks;
- in some implementations, the image organization web application includes package definitions 224 to refer to one or more sets of dependencies located in a directory and a layer optimizer 226 to organize layers of the service image in accordance with an optimized layer schedule;
- a data retrieval module 376, which builds and executes queries to retrieve data from one or more databases 377. The databases 377 may be stored locally on the server 108 or stored at an external database system. In some implementations, data from two or more databases may be blended;
- one or more databases 377, which may store data used or created by the image organization web application 370 or image organization application 222. The databases 377 may store data sources 378, which provide the data used in the generated image organizations. Each data source 378 includes one or more data fields 380;
- a build engine 382, which selects an image to be built, verifies that the image to be built is not yet in existence, and building the image.

The databases 377 may store data in many different formats, and commonly include many distinct tables, each with a plurality of data fields 380. Some databases 377 comprise a single table. The data fields 380 include both raw fields from the database (e.g., a column from a database table or a column from a spreadsheet) as well as derived data fields, which may be computed or constructed from one or more other data fields. In some instances, derived data fields are accessed by stored procedures or views in the database. In some implementations, the definitions of derived data fields 380 are stored separately from the data source 378. In some implementations, the databas 377 store other information, including other information used by the image organization application 222 or image organization web application 370. The databases 377 may be separate from the image organization server 108, or may be included with the image organization server (or both).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 360 stores a subset of the modules and data structures identified above. In some implementations, the memory 360 stores additional modules or data structures not described above.

Although FIG. 3 shows an image organization server 108, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 108 may be stored or executed on a computing device 200. In some implementations, the functionality and/or data may be allocated between a computing device 200 and one or more servers 108. Furthermore, one of skill in the art recognizes that FIG. 3 need not represent a single physical device. In some implementations, the server functionality is allocated across multiple physical devices that comprise a server system. As used herein, references to a "server" or "image organization server" include various groups, collections, or arrays of servers that provide the described functionality, and the physical servers need not be physically collocated (e.g., the individual physical devices could be spread throughout the United States or throughout the world).

Figure 4A:
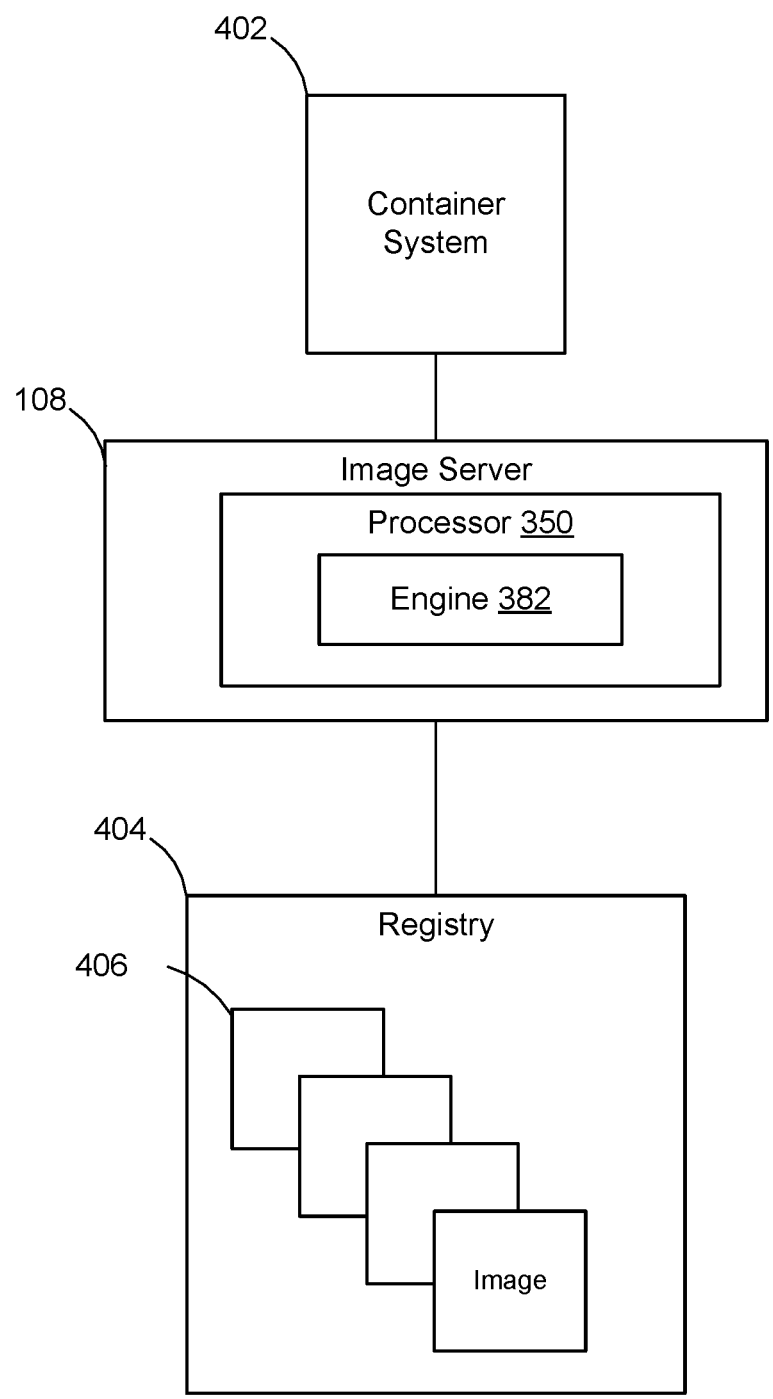
FIGS. 4A-4C are block diagrams of an exemplary deployment system in accordance with some implementations.

FIG. 4A illustrates an exemplary block diagram of a deployment system for service images. As described herein, a service image is a blueprint of an application in a container. Containers are used within the Docker system to run the application and may contain multiple images. A computing device (e.g., the image organization server 108) is in communication with a container system 402 (e.g., Docker system) and to a registry 404. The server 108 includes a processor 350 operating a build engine 382. The computing device may include a daemon to manage building, running, and distributing containers and is the process that runs within the operating system. The build engine 382 creates images 406 which are then stored in the registry 404. The registry 404 stores one or more images 406, which can be deployed to environments to operate as the computing functionality provided by the specific images 406.

Figure 4B:
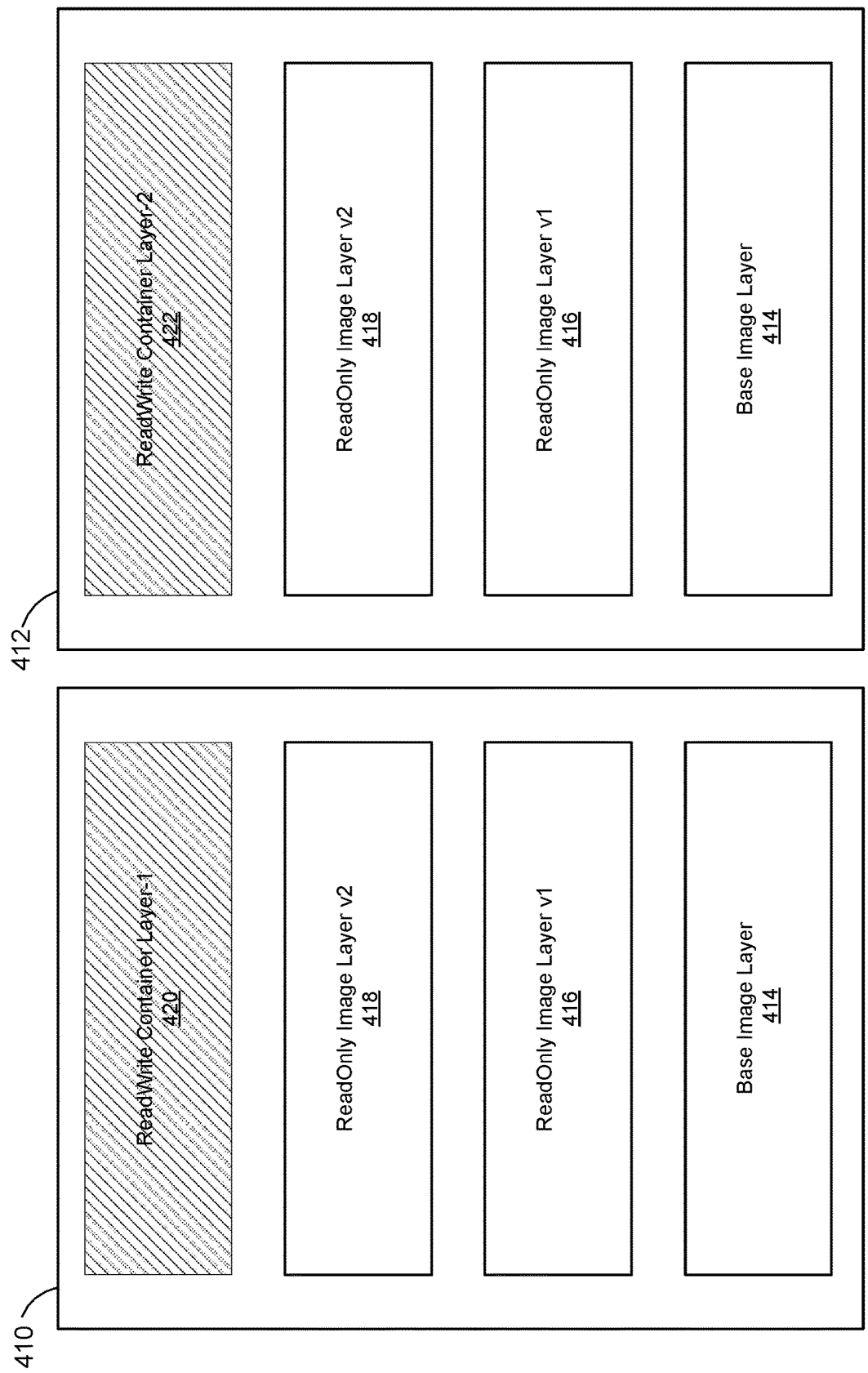

FIG. 4B illustrates an exemplary block diagram of service images. The first service image 410 and the second service image 412 are both service images but are not the same service image. As described above, image files tend to get larger over time and large image files take longer to deploy. Slow deployment times, ineffective auto-scaling, and failover solutions can negatively impact user experiences.

Figure 4C:
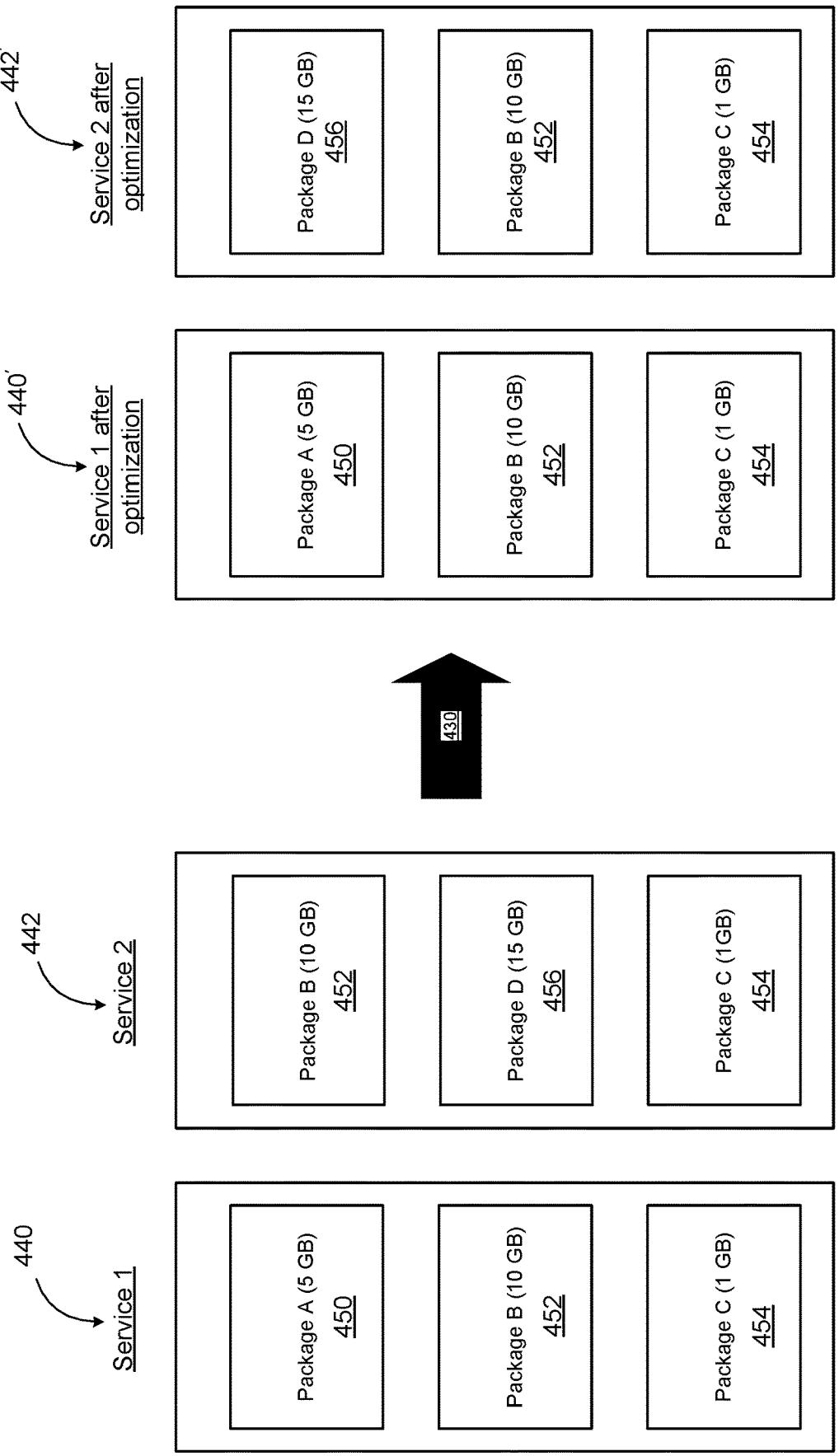

The first service image 410 includes a base image layer 414, a first image layer v1 (416), a second image layer v2 (418), and a first read/write layer 420. The second service image 412 includes the base image layer 414, the first image layer v1 (416), the second image layer v2 (418), and a second read/write layer 422. Both service images 410 and 412 include four layers, of which three are identical (layers 414, 416, and 418). The top layers 420 and 422 are the only distinguishing layers between the two service images. FIG. 4C describes organizing the layers of the service images to maximize layer overlap.

FIG. 4C illustrates an exemplary block diagram of two service images before and after layer organization in accordance with some embodiments. The first service image 440 includes package A 450, B 452, and C 454. The second service image 442 includes package B 452, D 456, and C 454. In this case, each of the layers consists of a single package, and the content of each package is independent of the other packages. Therefore, before building a final image for each of these services, the order of the layers (packages here) can be changed. In the illustrated order for the service images 440 and 442, only package C 454 can be shared, because sequencing package D 456 before package B 452 in the second service image 442 precludes sharing package B 452.

After optimization, the initial set of layers for both service images 440' and 442' include both package A 450 and package B 452, so both of these can be shared. Without the optimization, the total storage size is (size of service image 440)+(size of service image 442)−(shared size, from the bottom), which is (1+10+5)+(1+15+10)−(1)=41. With the optimization, the total storage size is (size of service image 440')+(size of service image 442')−(shared size, from the bottom), which is (1+10+5)+(1+15+10)−(1+10)=31. The reduction from 41 GB to 31 GB is based on the sharing of package B 452.

Figure 5:
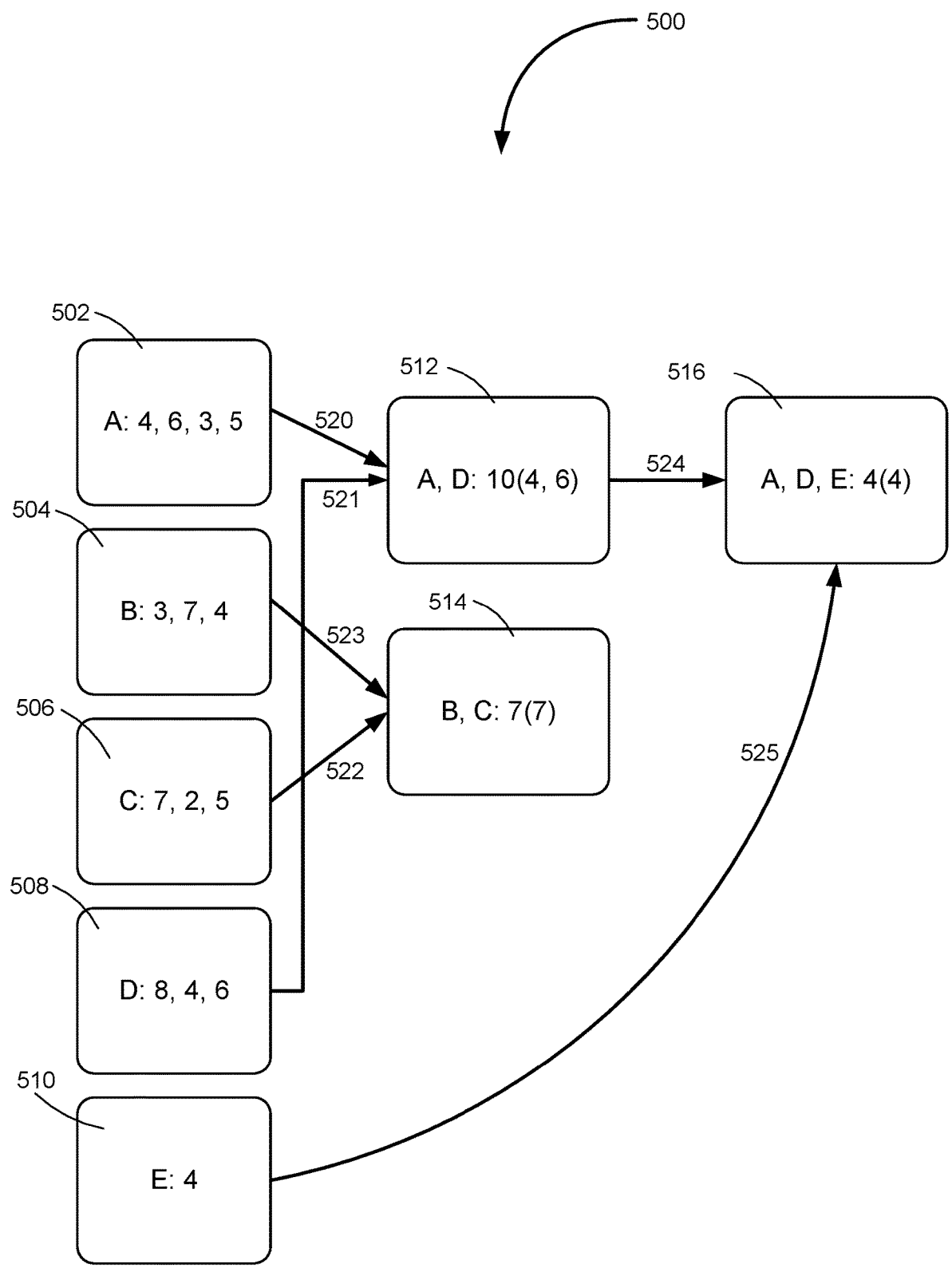
FIG. 5 illustrates a process for organizing deployment layers for a service image in accordance with some implementations.

FIG. 5 illustrates a process 500 for determining an ordered sequence of component packages for each of the software services that maximizes the total size of shared initial component packages across the software services. The five nodes on the left are the original nodes representing service images (node A 502; node B 504; node C 506; node D 508; and node E 510). The other three nodes are artificial nodes that are constructed during the optimization process. Each of the nodes (both original and artificial) includes a set of number that representing the sizes of layers in the service images. In addition to the nodes, there are edges (not shown) between nodes that have shared size numbers. The weight of an edge is the total size of shared numbers. For example, there is an edge between node A 502 and node B 504 because these two nodes share the numbers (sizes) 3 and 4. The weight of this edge is 7 (=3+4). These are undirected edges.

The first step in the process is to identify the pair of nodes having an adjoining edge with the largest weight. This first pair of nodes consists of node A 502 and node D 508 because they share the two numbers 4 and 6. The process forms the A,D artificial node 512, as indicated by the directed edges 520 and 521. This A,D artificial node 512 includes the numbers 4 and 6 (only the shared numbers). At this point, nodes A 502 and B 508 are omitted from further processing. New edges are created from the artificial node A,D 512 to the other remaining nodes.

In the next iteration, the largest edge has weight 7, and is an edge that connects nodes B 504 and node C 506. As in the first iteration, the process creates a new B,C artificial node 514, and this artificial node 514 includes just the number 7. As shown in FIG. 5, the process creates the directed edges 522 and 523 from the nodes C and B to the artificial node 514. At this point, original nodes B 504 and C 506 are omitted from further processing. New edges are created from the artificial node B,C 514 to the other remaining nodes.

At this point there are only three nodes remaining to consider: original node E 510, artificial node A,D 512, and artificial node B,C 514. In the third iteration, there is one more edge, because artificial node A,D 512 and original node E 510 share the number 4. Therefore, we create one more artificial node A,D,E 516, which includes only the number 4, and create the directed edges 524 and 525 to this new artificial node A,D,E 516. Artificial node A,D 512 and original node E 510 are now omitted from further consideration. There are no edges from this new artificial node A,D,E 516 to any other node.

The fourth iteration has only two nodes to work with (artificial node B,C 514 and artificial node A,D,E 516), and there is not an edge between them, so the process stops.

Working backwards through the directed edges defines the sequence of layers within each of the service images. For example, based on the directed edges from Node A 502 to artificial node A,D 512 to artificial node A,D,E 516, the order for the numbers in the first service image A is 4, followed by 6, followed by 3 and 5. Note that the order of the numbers 3 and 5 is arbitrary, because it does not make a difference. In all, the orders within each of the service images is:

A: 4, 6, 3, 5
B: 7, 3, 4
C: 7, 2, 5
D: 4, 6, 8
E: 4.

This image organization method allows service images A, D, and E to share the layer '4' since each image uses the layer '4' in the same position within the image (e.g., base layer 414). Additionally, service images A and D would further share layer '6'. Service images B and C would share the base layer '7.'

Figure 6:
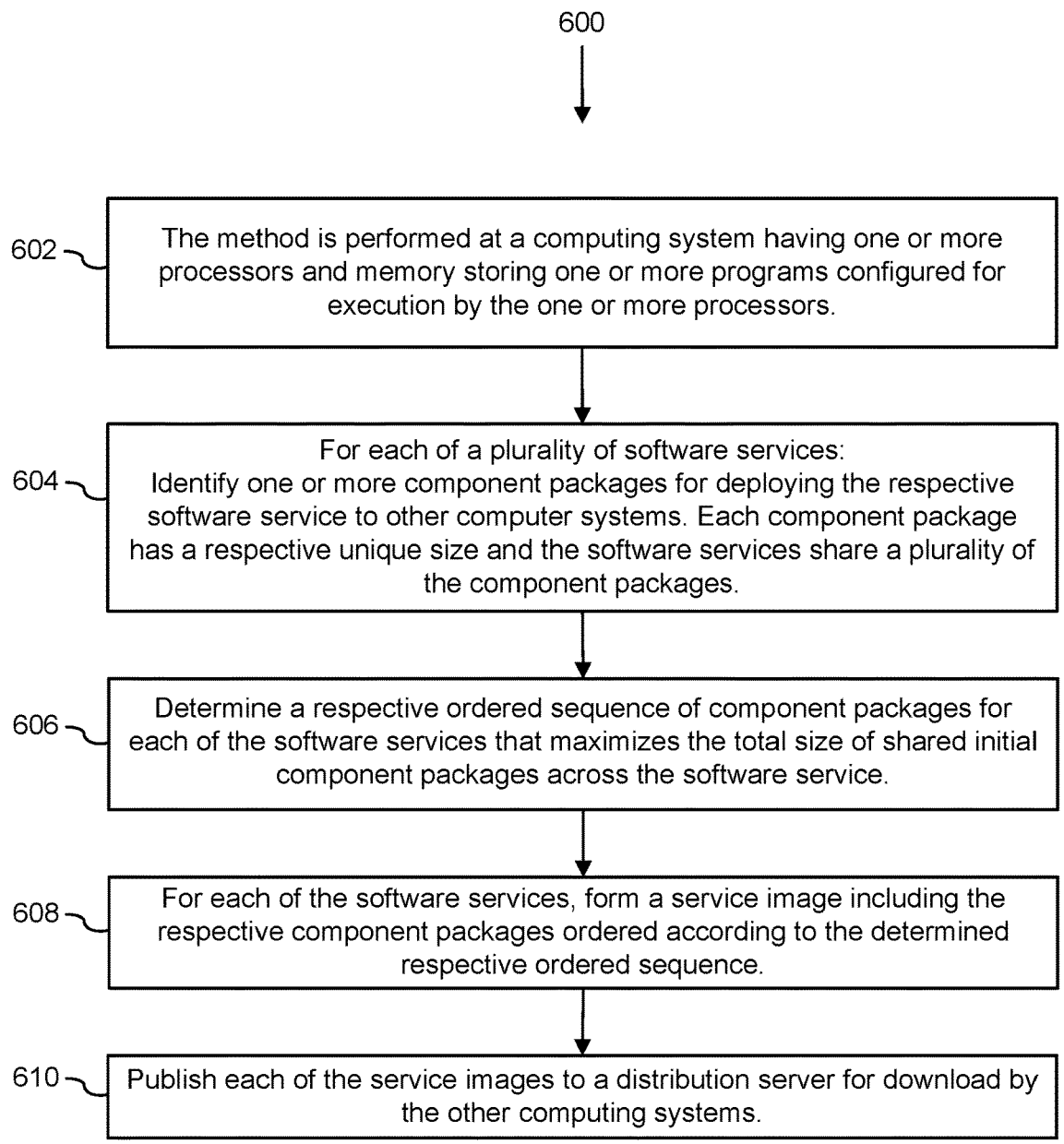
FIG. 6 provides a flowchart for a process that organizes image layers for a service image in accordance with some implementations.

FIG. 6 illustrates a method 600 for organizing packages in software deployment images in accordance with some implementations. The steps of the method 600 may be performed (602) by a computer (e.g., image organization server 108). FIG. 6 corresponds to instructions stored in a computer memory or computer readable storage medium (e.g., the memory of the computer system 108).

For each of a plurality of software services the server system 108 identifies (604) one or more component packages for deploying the respective software service to other computer systems. Each component package has (604) a respective unique size and the software services share (604) a plurality of the component packages (see FIG. 4B). The server system determines (606) a respective ordered sequence of component packages for each of the software services that maximizes the total size of shared initial component packages across the software service. For each of the software services, the server system forms (608) a service image including the respective component packages ordered according to the determined respective ordered sequence. The server system then publishes (610) each of the service images to a distribution server for download by the other computer systems.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of organizing layers in software deployment images, comprising:
at a computing system having one or more processors and memory storing one or more programs configured for execution by the one or more processors:
for each of a plurality of software services, identifying a respective plurality of image layers for deploying the respective software service to other computer systems, wherein each respective image layer has a respective unique size and the software services share a plurality of the image layers;
determining a respective ordered sequence of image layers for each of the software services that maximizes a total size of shared initial image layers across the software services, wherein a first software service having image layers with sizes $s_{1,1}, s_{1,2}, \ldots, s_{1,m}$ and a second software service having image layers with sizes $s_{2,1}, s_{2,2}, \ldots, s_{2,n}$ have shared initial image layers when there is a positive integer k with $s_{1,1}=s_{2,1}$, $s_{1,2}=s_{2,2}, \ldots$, and $s_{1,k}=s_{2,k}$;
storing each of the image layers in the memory;
for each of the software services, forming a respective service image comprising a manifest specifying the respective image layers ordered according to the respective determined ordered sequence; and
publishing each of the service images to a distribution server for download by the other computing systems.

2. The method of claim 1, wherein each image layer comprises a single package.

3. The method of claim 1, wherein one or more of the image layers comprises two or more packages.

4. The method of claim 1, wherein a size of the shared initial image layers is $s_{1,1}+s_{1,2}+\ldots+s_{1,k}$.

5. The method of claim 1, wherein determining the respective ordered sequence of image layers for each of the software services comprises:
for each software service, forming a respective node containing sizes of the respective plurality of image layers in the respective node;
for each pair of nodes having at least one shared size, forming a respective edge, between the respective pair or nodes, having weight equal to a respective total of shared sizes between the respective pair of nodes; and
selecting from the edges to maximize total size of shared initial image layers.

6. The method of claim 5, wherein selecting from the edges to maximize total size of shared initial image layers comprises:
iteratively identifying a pair of nodes having an edge with maximal weight, forming a new artificial node whose sizes correspond to sizes in the identified maximal edge, forming a respective directed edge from each of the nodes in the identified pair of nodes to the new artificial node, and disregarding the identified pair of nodes in subsequent iterations, until there are no remaining edges among remaining nodes; and
traversing the directed edges in reverse to form each of the ordered sequences of image layers for respective software services.

7. A system for organizing packages in software deployment images, comprising:
one or more processors;
memory; and
one or more programs stored in the memory, wherein the one or more programs are configured for execution by the one or more processors and including instructions for:
for each of a plurality of software services, identifying a respective plurality of image layers for deploying the respective software service to other computer systems, wherein each respective image layer has a respective unique size and the software services share a plurality of the image layers;
determining a respective ordered sequence of image layers for each of the software services that maximizes a total size of shared initial image layers across the software services, wherein determining the respective ordered sequence of image layers for each of the software services comprises:
for each software service, forming a respective node containing sizes of the respective plurality of image layers in the respective node;
for each pair of nodes having at least one shared size, forming a respective edge, between the respective pair or nodes, having weight equal to a respective total of shared sizes between the respective pair of nodes; and
selecting from the edges to maximize total size of shared initial image layers;
storing each of the image layers in the memory;
for each of the software services, forming a respective service image comprising a manifest specifying the respective image layers ordered according to the respective determined ordered sequence; and
publishing each of the service images to a distribution server for download by the other computing systems.

8. The system of claim 7, wherein each image layer comprises a single package.

9. The system of claim 7, wherein one or more of the image layers comprises two or more packages.

10. The system of claim 7, wherein a first software service having image layers with sizes $s_{1,1}, s_{1,2}, \ldots, s_{1,m}$ and a second software service having image layers with sizes $s_{2,1}, s_{2,2}, \ldots, s_{2,n}$ have shared initial image layers when there is a positive integer k with $s_{1,1}=s_{2,1}$, $s_{1,2}=s_{2,2}, \ldots$, and $s_{1,k}=s_{2,k}$.

11. The system of claim 10, wherein a size of the shared initial image layers is $s_{1,1}+s_{1,2}+\ldots+s_{1,k}$.

12. The system of claim 7, wherein selecting from the edges to maximize total size of shared initial image layers comprises:
iteratively identifying a pair of nodes having an edge with maximal weight, forming a new artificial node whose sizes correspond to sizes in the identified maximal edge, forming a respective directed edge from each of the nodes in the identified pair of nodes to the new artificial node, and disregarding the identified pair of nodes in subsequent iterations, until there are no remaining edges among remaining nodes; and
traversing the directed edges in reverse to form each of the ordered sequences of image layers for respective software services.

13. A non-transitory computer-readable storage medium, storing one or more programs configured for execution by one or more processors of a server system, the one or more programs including instructions for:
- for each of a plurality of software services, identifying a respective plurality of image layers for deploying the respective software service to other computer systems, wherein each respective image layer has a respective unique size and the software services share a plurality of the image layers;
- determining a respective ordered sequence of image layers for each of the software services that maximizes a total size of shared initial image layers across the software services, wherein a first software service having image layers with sizes $s_{1,1}, s_{1,2}, \ldots, s_{1,m}$ and a second software service having image layers with sizes $s_{2,1}, s_{2,2}, \ldots, s_{2,n}$ have shared initial image layers when there is a positive integer k with $s_{1,1}=s_{2,1}$, $s_{1,2}=s_{2,2}, \ldots$, and $s_{1,k}=s_{2,k}$;
- storing each of the image layers in the memory;
- for each of the software services, forming a respective service image comprising a manifest specifying the respective image layers ordered according to the respective determined ordered sequence; and
- publishing each of the service images to a distribution server for download by the other computing systems.

14. The computer-readable storage medium of claim 13, wherein each image layer comprises a single package.

15. The computer-readable storage medium of claim 13, wherein a size of the shared initial image layers is $s_{1,1}+s_{1,2}+\ldots+s_{1,k}$.

16. The computer-readable storage medium of claim 13, wherein determining the respective ordered sequence of image layers for each of the software services comprises:
- for each software service, forming a respective node containing sizes of the respective plurality of image layers in the respective node;
- for each pair of nodes having at least one shared size, forming a respective edge, between the respective pair or nodes, having weight equal to a respective total of shared sizes between the respective pair of nodes; and
- selecting from the edges to maximize total size of shared initial image layers.

17. The computer-readable storage medium of claim 16, wherein selecting from the edges to maximize total size of shared initial image layers comprises:
- iteratively identifying a pair of nodes having an edge with maximal weight, forming a new artificial node whose sizes correspond to sizes in the identified maximal edge, forming a respective directed edge from each of the nodes in the identified pair of nodes to the new artificial node, and disregarding the identified pair of nodes in subsequent iterations, until there are no remaining edges among remaining nodes; and
- traversing the directed edges in reverse to form each of the ordered sequences of image layers for respective software services.

\* \* \* \* \*